United States Patent

Shenfeld et al.

[15] 3,644,252
[45] Feb. 22, 1972

[54] ADHESIVE COMPOSITIONS CONTAINING STYRENE/ISOBUTYLENE COPOLYMER

[72] Inventors: Richard S. Shenfeld; Frederick M. Musser; Girish U. Kothari, all of Chicago, Ill.

[73] Assignee: Velsicol Chemical Corporation, Chicago, Ill.

[22] Filed: May 13, 1969

[21] Appl. No.: 824,317

[52] U.S. Cl. .....................260/27 R, 156/334, 117/138.8 F, 117/161 UT, 260/27 EV, 260/30.6 R, 260/31.6, 260/31.8 M, 260/33.6 PQ, 260/33.8 UA, 260/41 R, 260/41 A, 260/41 B, 260/45.95, 260/88.2 C, 260/896, 260/897 B
[51] Int. Cl. .........................................C08f 41/12
[58] Field of Search ...................260/897 B, 31.6, 27 R, 41 R

[56] References Cited

UNITED STATES PATENTS

| 3,386,929 | 6/1968 | Brunel | 260/4 |
| 3,318,977 | 5/1967 | Battersby et al. | 260/889 |
| 3,321,427 | 5/1967 | Tyran | 260/28.5 |

Primary Examiner—Samuel H. Blech
Assistant Examiner—C. J. Seccuro
Attorney—Robert J. Schwarz

[57] ABSTRACT

This invention discloses a new hot-melt, pressure-sensitive adhesive composition comprising a primary polymer consisting of a solid, homogeneous and essentially random copolymer of styrene and isobutylene having a number average molecular weight of from about 1,000 to about 4,000, a heterogeneity index of from about 1.50 to about 2.25 and a styrene content of from about 40 to about 90 weight percent, and a secondary polymer selected from the group consisting of a copolymer of ethylene and vinyl acetate, a copolymer of ethylene and an alkyl acrylate, a polyvinyl-alkyl ether, a terpolymer of ethylene, vinyl acetate and acrylic acid, and a terpolymer of ethylene, vinyl acetate and methacrylic acid.

7 Claims, No Drawings

ADHESIVE COMPOSITIONS CONTAINING STYRENE/ISOBUTYLENE COPOLYMER

This invention relates to new pressure-sensitive adhesive compositions. More particularly, this invention relates to new hot-melt, pressure-sensitive adhesive compositions containing as an essential component a novel copolymer of styrene and isobutylene.

Pressure-sensitive adhesives can be defined as adhesive materials which adhere tenaciously upon application of only light pressure at ambient temperatures, and which, in most instances, can be removed cleanly from the surface upon which they are applied. These pressure-sensitive adhesives are widely used in a variety of applications, such as adhesive tapes, labels, decals and decorative papers, for sealing, masking, mending, fastening and decorative purposes.

Typically, pressure-sensitive adhesives consist of a tackifier resin, an elastomeric material and optionally such additives as plasticizers, fillers, antioxidants, extender resins, and the like. The tackifier resins which are commonly used vary greatly in their physical properties and chemical makeup and include such materials as polyterpene resins, rosin esters, rosin derivatives, petroleum hydrocarbon resins, coumaroneindene resins, and the like. The elastomeric materials utilized in pressure-sensitive adhesives are the rubbery materials such as reclaimed rubber, natural rubber, styrene butadiene rubber, polyisobutylene or butyl rubber, or butadiene acrylonitrile rubber, polychloroprene rubber, polybutadiene rubber, polyisoprene rubber, and the like.

In order to apply these pressure-sensitive adhesives onto a suitable substrate for final use, they are normally dissolved in an organic solvent or, in some instances, they are emulsified to form an aqueous latex. The solution or emulsion of the adhesive is then coated onto the particular substrate desired and is evaporated leaving a solid film possessing pressure-sensitive properties.

Solvated adhesive systems, in spite of their preponderant use, possess numerous disadvantages. For example, solvent base pressure-sensitive adhesives are both fire and health hazards requiring explosionproof application equipment and suitable ventilation for the removal of solvent. Furthermore, the expedient removal of solvent from an adhesive used in a commercial production line requires drying ovens which use up valuable space and increase operating costs.

As a result it would be desirable to apply pressure-sensitive adhesives onto the desired substrates without the use of liquid diluents or solvents. In particular, it would be desirable to apply such adhesives in the molten state as hot melts. The term "hot melts" is used in the adhesive industry to designate compositions which are solids at room temperature and which upon heating melt and flow freely for application to a substrate. The use of hot-melt adhesives, or adhesives applied in the molten state without the use of solvents or liquid diluents, obviates many of the disadvantages inherent in solvent-based systems. Thus, fire hazards are virtually eliminated since hot melts contain no flammable components. Furthermore, hot-melt coating machinery is generally less expensive than machinery for coating solvent adhesives and also requires less space since drying ovens are eliminated.

In response to the various advantages which can be realized through the use of hot melts, the adhesive industry has recently attempted to substitute hot-melt adhesives for many of the applications where solvent-based adhesives have been used in the past. In the area of pressure-sensitive adhesives, however, such attempts have met with only limited success since typical hot melts do not possess pressure-sensitive properties and pressure-sensitive adhesive compositions generally decompose upon heating. The thermal instability of the majority of pressure-sensitive adhesives is due to the elastomeric constituents which they contain. The elastomeric materials which comprise both the natural and synthetic rubbers, while possessing the properties useful for pressure-sensitive adhesives, are not thermoplastic and are therefore unsuited in hot melts.

Surprisingly, it has now been found that a pressure-sensitive adhesive exhibiting excellent thermal stability can be prepared by using a novel copolymer of styrene and isobutylene. More specifically, it has been found that a hot-melt pressure-sensitive adhesive composition can be readily obtained by combining novel copolymers of styrene and isobutylene with a polymer selected from the group consisting of a copolymer of ethylene and vinyl acetate, a copolymer of ethylene and alkyl acrylate, a polyvinyl-alkyl ether, a terpolymer of ethylene, vinyl acetate and acrylic acid, and a terpolymer of ethylene, vinyl acetate and methacrylic acid.

Thus, one embodiment of the present invention resides in a hot-melt pressure-sensitive adhesive composition which comprises a primary polymer consisting of the copolymer of styrene and isobutylene hereinafter described and a secondary polymer selected from the group consisting of a copolymer of ethylene and vinyl acetate, a copolymer of ethylene and alkyl acrylate, a polyvinyl-alkyl ether, a terpolymer of ethylene, vinyl acetate and acrylic acid, and a terpolymer of ethylene, vinyl acetate and methacrylic acid.

The novel copolymers of styrene and isobutylene which are suitable for preparing the hot-melt pressure-sensitive adhesive compositions of this invention are highly homogeneous and essentially random, solid copolymers which have a low molecular weight, a broad molecular weight distribution and a high weight content of styrene. These copolymers are further characterized by a combination of several other properties or characteristics such as a particular heat-softening point range, optical clarity, thermal stability and a high degree of compatibility with other polymers and polymer systems.

The copolymers of styrene and isobutylene of this invention are capable of having a high content of styrene up to as high as 90 or, more usually, 40 to 80 weight percent. Yet, they are still highly homogeneous at such levels in that the copolymers are composed essentially of styrene and isobutylene copolymer units to the substantial exclusion of either styrene or isobutylene homopolymer units. The styrene content of the copolymer ranges from as low as about 40 to as high as about 90 weight percent with the corresponding isobutylene content ranging from about 60 to about 10 weight percent. The preferred copolymers, however, contain a relatively high content of styrene within the range of from about 40 to about 70 weight percent styrene.

A high concentration of styrene is usually difficult to achieve especially when copolymers of highly uniform composition are desired consisting essentially of styrene and isobutylene copolymer units to the substantial exclusion or absence of any styrene homopolymer units. Nevertheless, such uniform, highly homogeneous copolymers are readily achieved in essentially quantitative yields when prepared according to the preparational method as hereafter described.

The molecular weight of the copolymers of styrene and isobutylene of this invention in contradistinction to the typical copolymers of styrene and isobutylene is very low and moreover must be within a limited range in order that the copolymers possess the desired set of properties for hot-melt pressure-sensitive adhesives. As used herein molecular weight is described both in terms of the weight average molecular weight $\overline{M}_w$, and the number average molecular weight $\overline{M}_n$. However, unless specified to the contrary, when used herein and in the appended claim, molecular weight will mean the number average molecular weight $\overline{M}_n$. The significance of these conventional molecular weight terms as well as methods for their determination are more fully described in the "Structures of Polymers," M.I. Miller, Reinhold, New York, 1966. In general, the molecular weight of the copolymers of styrene and isobutylene of this invention can range from about 1,000 to about 4,000. A more limited molecular weight range, however, which is readily achieved by utilization of the preparational method of this invention is preferred and ranges from about 1,200 to 3,500. This latter limited range is particularly preferred in that the copolymers having this low molecular weight range are especially suitable for use in hot-melt pressure-sensitive adhesives.

In addition to a limited, low molecular weight range, the copolymers of styrene and isobutylene of this invention have a broad molecular weight distribution. This distribution of the molecular weights of the copolymer may be described conventionally in terms of a heterogeneity index which is defined as the ratio of the weight average molecular weight to the number average molecular weight, $\overline{M}_w/\overline{M}_n$. Usually, the heterogeneity index, $\overline{M}_w/\overline{M}_n$, for the copolymers can range from about 1.50 to about 2.25. Typically, however, for copolymers having the preferred molecular weight, the heterogeneity index ranges from about 1.65 to about 2.15.

As indicated, the copolymers of styrene and isobutylene of this invention are characterized by a high degree of randomness, that is, the copolymers consist essentially of basic repeating units of the following formula:

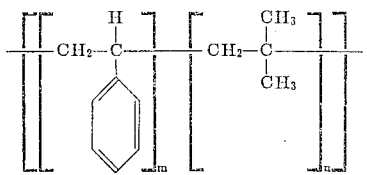

wherein $m$ and $n$ are integers from 1 to about 15, and the styrene and isobutylene moieties are distributed in an essentially random manner. Furthermore, the above basic repeating unit is located along the polymer chain in an essentially random distribution. The total number of described basic repeating units in the copolymer is such that the number average molecular weight is from about 1,000 to about 4,000. Thus the polymers of styrene and isobutylene of this invention do not contain long sequences of styrene or isobutylene units, not do they contain long sequences of alternating styrene and isobutylene units. This distinguishes these copolymers from block-type copolymers which essentially contain long sequences of styrene and isobutylene units along their molecular chain. It also distinguishes the copolymers from a graft-type copolymer where repeating units of either styrene or isobutylene are attached to a backbone chain of the other. In addition to indicating the random nature of the copolymer of this invention the above formula also serves to illustrate the specific nature of the copolymer in that there are substantially no ring alkylated styrene residues in the polymer arising from an in situ alkylation of the styrene by the isobutylene and further that the polymerization of the isobutylene unit takes place so that there are two methyl groups and not only one perpendicular to the molecular chain.

The styrene-isobutylene copolymers of this invention, as indicated, are normally solid materials and have relatively high heat-softening points. As measured by the ring and ball method, the heat-softening point of the copolymers can range from about 125° F. to about 225° F. A more limited range of from about 130° F. to about 225° F. and especially from about 140° to 205° F. is preferred, however, for maximizing the usefulness of the copolymers in applications as hot-melt pressure-sensitive adhesives. A further and important characterizing property of the copolymers of this invention is that they have good thermal stability and are stable against chemical decomposition at temperatures above 350° C.

While the copolymers of styrene and isobutylene of this invention can be defined by reference to the above characterizing properties such as molecular weight, molecular weight distribution, randomness and compositional homogeneity, as well as softening points, such properties are a function of or interrelated to their specific method of preparation. Accordingly, the copolymers can, in addition to such properties, also be defined or characterized by references to such method of preparation. In preparing the copolymers according to this invention, a specific preparational method should be utilized in order that all of the above-described properties be obtained especially in the preferred ranges. Utilization of such method, moreover, not only permits the obtainment of the desired copolymers, but in addition achieves such result with almost theoretical conversions and in a particular convenient and desirable industrial manner. This preparational method involves an interrelated combination of processing features which basically comprises an elevated polymerization temperature, a particular catalyst system and a certain mode of conducting the polymerization reaction. This method is effected, in general, by gradually bringing the styrene and isobutylene into reactive contact, in the presence of a hydrocarbon polymerization solvent, with a catalyst system of a primary catalyst and a cocatalyst while maintaining an elevated polymerization temperature.

The catalyst system which is utilized in the preparation is composed of a primary catalyst and a cocatalyst which are maintained in a specific, relative proportion. Both the selection of the primary catalyst and the cocatalyst and their relative proportions in the catalyst system are important to the success of the method in producing high yields of copolymers having all of the ultimately desired properties. The primary catalyst can consist of at least one alkyl aluminum dihalide wherein the alkyl portion can have from one to about five carbon atoms including, for example, such groups as methyl, ethyl, propyl and butyl and the halide portion can be a halogen atom having an atomic weight within the range of from about 35 to about 80 including, for example, chlorine and bromine. Of the various alkyl aluminum dihalides which can be employed, the preferred primary catalyst is ethyl aluminum dichloride.

The cocatalyst utilized in combination with the primary catalyst in the catalyst system comprises at least one material selected from the group consisting of water, an alkyl halide, a hydrogen halide or an alcohol. Examples of these cocatalysts include alcohols such as alkanols having from one to about five carbon atoms in the alkyl portion of the molecule, such as ethyl alcohol, propyl alcohol, tertiary butyl alcohol or mixtures thereof; secondary or tertiary alkyl halides where the alkyl portion contains from about three to about five carbon atoms and where the halide portions is the same as defined above, such as butyl chloride, propyl chloride or pentyl chloride; or a hydrogen halide such as hydrogen chloride or hydrogen bromide. Of the various catalysts which can be employed, an alkanol such as tertiary butyl alcohol or an alkyl halide such as tertiary butyl chloride and especially water are preferred and particularly when used in combination with the preferred primary catalyst, ethyl aluminum dichloride.

As indicated, the relative proportions or ratio of the cocatalyst to catalyst in the catalyst system is important in achieving copolymers having the desired set of properties. While this ratio can vary depending upon such factors as the particular catalyst and cocatalyst used, it should be maintained within certain limits if copolymers of the desired properties such as molecular weight and molecular weight distribution are to be achieved. Generally, the cocatalyst should be present in the catalyst system within a range of from about 2 to 30 mol percent based upon the mols of the primary catalyst present. A more limited range of from about 2.5 to 15 or about 5 to about 10 mol percent is preferred for such cocatalysts as water and particularly when used with the preferred, primary catalyst, ethyl aluminum dichloride. The quantity of the primary catalyst used in the catalyst system which in turn determines the quantity of cocatalyst can also be varied. The particular amount used is dependent upon such factors as the particular primary catalyst, the cocatalyst and the polymerization temperature. Generally, the quantity of the primary catalyst can range from about 0.20 to about 1.5 weight percent based upon the combined weight of the styrene and isobutylene monomers. A more limited range of about 0.25 to 1.2 or about 0.4 to about 1.0 is preferred, however, when employing catalyst systems containing ethyl aluminum dichloride in combination with cocatalysts such as water, alkyl halides or alkanols.

In preparing the catalyst system, the cocatalyst and the primary catalyst can be admixed in the desired ratio prior to the polymerization. More preferably, it can be prepared in the presence of the solvent just prior to polymerization by simply adding the appropriate quantities of catalyst and cocatalyst to the solvent with mixing. The primary catalyst itself can also be prepared in situ during or just prior to the polymerization by combining the necessary materials to form the desired alkyl aluminum dihalide. For example, aluminum chloride can be admixed with diethyl aluminum chloride in the appropriate proportion to form the active, preferred ethyl aluminum dichloride catalyst in situ. Generally, however, it is preferable to add the primary catalyst as a relatively pure compound to the solvent together with the cocatalyst just prior to the polymerization.

The temperature utilized in effecting the polymerization, as indicated, is unusually high for the polymerization of styrene and isobutylene to form normally solid copolymers. Nevertheless, this high temperature is a novel and important feature of the preparational method of the copolymer of styrene and isobutylene of this invention. Utilization of such high temperature in combination with the catalyst system as well as with the mode of conducting the polymerization permits the attainment of the unique copolymers of this invention having all of the desirable properties such as low molecular weight and a broad molecular weight distribution. Moreover, employment of this elevated temperature allows the polymerization to be conducted in a highly convenient and desirable manner in that the extensive cooling, critical in effecting the low temperature polymerization of styrene and isobutylene, is necessary. The polymerization temperature can range from about 10° to about 50° C. with the specific temperature utilized within this range being dependent upon such factors as the catalyst system employed, the solvent and the ultimately desired properties of the copolymer. Usually, however, a more limited temperature range is preferred of from about 15° to about 25° C. or about 20° C. especially when preparing the preferred class of copolymers according to this invention.

The hydrocarbon solvent used to effect the polymerization can include a wide class of hydrocarbon polymerization solvents. The particular solvent employed in the polymerization, however, will affect the ultimate properties of the copolymer produced. Accordingly, it is important to select a solvent or combination of solvents which provides a copolymer having the ultimately desired properties. The solvents which can be used individually or in combination include aliphatics such as alkanes containing from about six to about 10 carbon atoms per molecule such as hexane or heptane and aromatics such as benzene or alkylated benzenes such as toluene, xylene or ethyl benzene. Of the various solvents which can be utilized, preferred solvents are alkanes such as hexane or heptane or mixtures thereof. The quantity of solvent employed can be varied but there should at least be a quantity of solvent present sufficient to provide a readily stirrable reaction mixture. Typically when using solvents such as hexane this amount ranges from about 0.5 to about 2 weight parts or preferably equal weight parts of solvent per one weight part of the combined styrene and isobutylene charge.

In conducting the preparational method, another important processing feature in combination with the features of the catalyst system and elevated polymerization temperature is the particular mode used to bring the styrene and isobutylene into reactive contact with the catalyst system. It is most important that the styrene and isobutylene be gradually contacted with the catalyst system in the presence of the solvent if the copolymers of the desired properties are to be achieved. This contacting is preferably effected by gradually adding both the styrene and isobutylene to the solvent containing the catalyst system while maintaining the desired polymerization temperature. In gradually adding the styrene and isobutylene, preferably admixed in a single feed stream, the time required to complete the addition will vary depending upon such factors as the particular catalyst system and the polymerization temperature utilized and to a lesser degree upon the scale of the reaction. Generally, however, the styrene and isobutylene should be added at a rate adjusted so that they are substantially completely polymerized upon contact with the catalyst system leaving substantially no unreacted monomer in the reaction mixture. Typically, this addition time can range from about 0.10 to 2 hours with addition times of from about 0.5 to 1.5 or about 1.0 hours being preferred for maximizing the desired properties of the copolymers produced. The charge stream of styrene and isobutylene gradually added to the mixture of solvent and catalyst system can contain styrene in an amount of from about 40 to 90 weight percent. However, when preparing the preferred copolymers according to this invention, the charge contains styrene in an amount ranging from about 40 to 70 weight percent.

The polymerization method for preparing the copolymers of styrene and isobutylene of this invention can be conducted in a batch, semibatch or continuous operation. A batch operation is usually suitable, however, and one illustrative procedure involves gradually adding a single stream of styrene and isobutylene monomers, admixed in the desired weight ratio, to the stirred solvent containing the appropriate catalyst system. The gradual addition of the styrene and isobutylene is regulated so that substantially all of the styrene and isobutylene are polymerized upon contact with the catalyst system leaving substantially no unreacted monomer in the reaction mixture. During the addition, the temperature of the exothermic reaction is maintained within the desired range by utilizing appropriate cooling means. When the addition of the monomers is complete, the copolymer product can then, if desired, be recovered from the reaction mixture. It is generally desirable, however, to leave the copolymer in the reaction mixture in the presence of the catalyst system at the polymerization temperature for a residence period sufficient to insure total, uniform polymerization. The length of this residence period can range from only a few minutes to 1 hour or more. Typically, residence periods ranging from about 0.25 to 3 hours are sufficient with about 0.75 to 2.5 or about 1 hour usually being preferred. After the copolymer has been in contact with the catalyst system for a sufficient residence period it can be removed from the reaction mixture and purified according to several different procedures. Advantageously, the removal procedure involves first eliminating the catalyst system from the reaction mixture by adding a solid adsorbant to adsorb the catalyst and the solids can then be eliminated as a solid filtrate. Alternatively acidic or basic materials can be added to form water-soluble adducts of the catalyst. Such adducts can then be removed by water washing of the reaction mixture. After the catalyst system has been eliminated by one of the above procedures or a combination thereof, the solvent and any impurities formed in the polymerization can be readily removed from the reaction mixture by distillation at reduced pressure, leaving the desired copolymer in high yield.

The following examples are offered to illustrate the novel copolymers of styrene and isobutylene of this invention and the method for their preparation. They are not intended, however, to limit the invention to the particular copolymers or preparational procedures.

EXAMPLE 1

A series of copolymers of styrene and isobutylene were prepared according to this invention by the following procedures.

Anhydrous hexane in an amount substantially equal in weight to the combined weight of the styrene and isobutylene to be polymerized was charged under a nitrogen atmosphere to a polymerization vessel equipped with an addition funnel, stirring and cooling means and an overhead condenser. The catalyst system was added by first charging a cocatalyst to the hexane with stirring followed by the addition of the primary catalyst consisting of freshly prepared substantially pure ethyl aluminum dichloride contained in heptane or hexane. After stirring for a period of time sufficient to insure adequate formation and dispersion of the catalyst system in the hexane, a premixed charge stream of styrene and isobutylene adjusted to the desired weight ratio was gradually added over a controlled addition time via the addition funnel while maintaining the desired polymerization temperature by cooling. After the addition was complete, the stirring was continued for a residence period sufficient to insure total and complete polymerization. The catalyst system was then removed by adding ethyl alcohol and solid calcium hydroxide to neutralize the catalyst system followed by adding an acid-acting clay to adsorb the neutralized catalyst residue. After filtering the clay from the reaction mixture, the solvent and any side products produced during polymerization were removed by distillation under reduced pressure of about 1 mm. Hg at a temperature of about 225° C. The polymerization conditions employed for the preparation of the copolymers are summarized in the following Table I and the properties of these copolymers are summarized in Table II.

In Table II, the molecular weights reported were determined using Gel Permeation Chromatography techniques employing absolute molecular weight standards determined by Vapor Pressure Osmometry techniques. The thermal degradation temperature, that is the temperature at which the copolymer chemically decomposes under application of heat, was determined using Differential Scanning Calorimetry techniques. The heat-softening point was obtained by the Ring and Ball Method of ASTM E28-58T.

TABLE II

| Copolymer No. | Weight average molecular weight $\bar{M}_w$ | Number average molecular weight $\bar{M}_n$ | Heterogeneity index, $\bar{M}_w/\bar{M}_n$ | Heat softening point, °F. | Thermal degradation, °C. | Appearance |
|---|---|---|---|---|---|---|
| 1 | 3,600 | 2,100 | 1.71 | 134 | | Clear, water white. |
| 2 | 4,525 | 2,450 | 1.84 | 141 | | Do. |
| 3 | 3,350 | 1,750 | 1.91 | 127 | | Do. |
| 4 | 3,450 | 2,000 | 1.72 | 130 | | Do. |
| 5 | 3,825 | 2,075 | 1.84 | 130 | | Do. |
| 6 | 3,875 | 2,100 | 1.84 | 134 | | Do. |
| 7 | 4,250 | 2,000 | 2.12 | 147 | | Do. |
| 8 | 3,875 | 2,000 | 1.93 | 163 | | Do. |
| 9 | 4,125 | 2,150 | 1.91 | 173 | | Do. |
| 10 | 4,175 | 2,150 | 1.91 | 164 | | Do. |
| 11 | 4,000 | 2,100 | 1.90 | 180 | | Do. |
| 12 | 4,175 | 2,100 | 1.98 | 179 | | Do. |
| 13 | 4,000 | 2,150 | 1.86 | 174 | | Do. |
| 14 | 4,550 | 2,650 | 1.71 | 201 | 397 | |
| 15 | 5,150 | 2,850 | 1.80 | 197 | 412 | Do. |
| 16 | 4,350 | 2,225 | 1.95 | 204 | | Do. |
| 17 | 4,725 | 2,275 | 2.07 | 195 | | Do. |
| 18 | 4,175 | 2,705 | 2.01 | 197 | | Do. |
| 19 | 3,350 | 1,250 | 2.68 | | | Clear, yellowish. |
| 20 | | | | | | Do. |
| 21 | 4,550 | 2,200 | 2.07 | 215 | 401 | Clear, water white. |
| 22 | 4,575 | 2,700 | 1.69 | 205 | 399 | Do. |
| 23 | 4,875 | 2,450 | 1.98 | 207 | 400 | Do. |
| 24 | 4,650 | 2,400 | 1.93 | 207 | 402 | Do. |
| 25 | 4,575 | 2,400 | 1.90 | 209 | 382 | Do. |
| 26 | 4,475 | 2,325 | 1.92 | 206 | 367 | Slight haze, water white. |
| 27 | 4,925 | 2,400 | 2.05 | | | |
| 28 | 3,975 | 2,125 | 1.87 | 213 | 367 | Slight haze, water white. |
| 29 | 5,250 | 2,750 | 1.90 | 218 | 402 | Clear, slight yellow. |

EXAMPLE 2

To demonstrate the random nature of the copolymers of styrene and isobutylene of this invention the following example is cited. A copolymer was degraded using lauryl peroxide and the degradation products were analyzed according to the following procedure.

About 50 grams of hexane and 4.0 grams of lauryl peroxide were charged to a sealed flask together with about 50 grams of copolymer No. 27 of Example 1. This copolymer analyzed by nuclear magnetic resonance spectroscopy was composed of 77.87 weight percent styrene. The mixture was heated at 70° C. for about 20 hours. During this period samples of the mixture were taken at intervals of 1, 2, 4 and 20 hours. The individual samples were filtered through a column of an acid-acting clay to remove acidic compounds and the filtrate was

TABLE I

| Copolymer No. | Styrene/isobutylene monomer weight ratio | Primary catalyst, weight percent[1] | Co-catalyst Type | Co-catalyst Mol percent[2] | Polymerization temperature, °C. | Addition time, minutes | Residence time, minutes | Yield percent |
|---|---|---|---|---|---|---|---|---|
| 1 | 50/50 | 1.0 | H₂O | 20 | 20 | 70 | 60 | 96 |
| 2 | 50/50 | 0.5 | H₂O | 5-10 | 20 | 60 | 180 | 96 |
| 3 | 50/50 | 0.5 | H₂O | 10 | 10-32 | 60 | 90 | 96.7 |
| 4 | 50/50 | 0.5 | H₂O | 7 | 20 | 60 | 60 | 92.0 |
| 5 | 50/50 | 0.5 | H₂O | 7 | 20 | 60 | 60 | 94.5 |
| 6 | 50/50 | 0.5 | H₂O | 5 | 20 | 40 | 60 | 96.0 |
| 7 | 60/40 | 0.5 | H₂O | 5 | 20 | 30 | 60 | 95 |
| 8 | 60/40 | 0.5 | H₂O | 5 | 20 | 30 | 60 | |
| 9 | 60/40 | 0.5 | H₂O | 10 | 20 | 65 | 60 | 89 |
| 10 | 60/40 | 0.5 | H₂O | 5 | 20 | 65 | 61 | |
| 11 | 65/35 | 0.5 | H₂O | 5 | 20 | 60 | 60 | 94.2 |
| 12 | 65/35 | 0.5 | H₂O | 5 | 20 | 60 | 60 | 94 |
| 13 | 65/35 | 0.5 | H₂O | 5 | 20 | 30 | 60 | 97.5 |
| 14 | 70/30 | 0.25 | H₂O | 10 | 20 | 60 | 60 | 96 |
| 15 | 70/30 | 0.5 | H₂O | 5 | 20 | 50 | 60 | 95 |
| 16 | 70/30 | 0.5 | H₂O | 5 | 20 | 30 | 60 | 92.5 |
| 17 | 70/30 | 0.5 | H₂O | 3 | 20 | 60 | 60 | 93.5 |
| 18 | 70/30 | 0.5 | H₂O | 5 | 20 | 60 | 60 | 95 |
| 19 | 75/25 | 1.0 | t-Bu Cl | 20 | 20-25 | 65 | 60 | 92 |
| 20 | 75/25 | 0.25 | t-Bu OH | 20 | 20-25 | 25 | 60 | 98.6 |
| 21 | 75/25 | 1.0 | H₂O | 10 | 20 | 30 | 60 | 83 |
| 22 | 75/25 | 0.5 | H₂O | 5 | 19-22 | 27 | 60 | 99 |
| 23 | 75/25 | 1.0 | H²O | 2.5 | 19-23 | 29 | 60 | |
| 24 | 75/25 | 1.0 | H₂O | 10 | 19-20 | 30 | 60 | 97 |
| 25 | 75/25 | 0.5 | H₂O | 7 | 19-20 | 30 | 120 | 99 |
| 26 | 75/25 | 0.25 | H₂O | 10 | 18-23 | 30 | 120 | 96 |
| 27 | 75/25 | 0.5 | H₂O | 2.5 | 19-24 | 35 | 120 | |
| 28 | 80/20 | 0.5 | H₂O | 7.5 | 20-23 | 60 | 120 | 96 |
| 29 | 80/20 | 0.5 | H₂O | 5 | 19-21 | 60 | 120 | |

[1] Based upon combined monomer weight.
[2] Based upon mols primary catalyst.

distilled at 1 to 4 mm. Hg pressure to a pot temperature of 225° C. The distilled samples were than analyzed by infrared spectroscopy for structural characteristics. The infrared spectra of all of the samples were substantially the same. This indicated that the copolymer is essentially random in nature and has no block copolymer characteristics of large blocks of polystyrene or polyisobutylene or any graft polymer characteristics of substantial chains of either polystyrene or polyisobutylene grafted to a backbone of the other.

As indicated the secondary polymer with which the copolymers of styrene and isobutylene of this invention can be combined to form a hot-melt pressure-sensitive adhesive composition is selected from the group consisting of a copolymer of ethylene and vinyl acetate, a copolymer of ethylene and an alkyl acrylate, a polyvinyl-alkyl ether, a terpolymer of ethylene, vinyl acetate and acrylic acid, and a terpolymer of ethylene, vinyl acetate and methacrylic acid. Combinations of these polymers can also be utilized in the adhesive compositions of this invention to achieve a specific balance of properties.

All of the secondary polymers are well known in the art and a number of them are sold commercially under various trade names. While all of these polymers can be utilized in the compositions of this invention, the use of polymers having certain ranges of properties is preferred.

Preferred copolymers of ethylene and vinyl acetate are those having a softening point (ring and ball method) of from about 180° F. to about 390° F., a percent vinyl acetate content of from about 15 to about 55 percent by weight and a melt index (ASTM Method D 1238) of from about 0.5 to about 500, and most preferred copolymers of ethylene and vinyl acetate have a melt index of from about 100 to about 300 and a percent vinyl acetate content of from about 24 to about 42 percent. Often two or more grades of such polymers can be blended to obtain a mixture having useful properties beyond those of the individual components.

The preferred copolymers of ethylene and alkyl acrylates which can be combined with the copolymers of styrene and isobutylene of this invention to form the novel adhesive compositions have a melt index of from about 2 to about 300 and an alkyl acrylate content which ranges from about 15 to about 40 weight percent. Exemplary suitable copolymers of ethylene and alkyl acrylates are copolymers of ethylene and ethyl acrylate, copolymers of ethylene and propyl acrylate, copolymers of ethylene and isobutyl acrylate, and the like.

The polyvinyl-alkyl ether resins which are most useful for preparing the compositions of this invention are polyvinyl-methyl ether, polyvinyl-ethyl ether and polyvinyl-isobutyl ether. The preferred polyvinyl-alkyl ethers for the purpose of this invention have a melt index of from about 20 to about 300.

The terpolymers of ethylene, vinyl acetate and acrylic acid, and of ethylene, vinyl acetate and methacrylic acid which can be suitably used in the pressure-sensitive adhesive compositions of the present invention are fully described in U.S. Pat. No. 3,215,678.

To obtain hot-melt pressure-sensitive adhesive compositions of the present invention the copolymers of styrene and isobutylene are combined with the secondary polymers enumerated above in certain proportions. Generally the compositions can comprise of from about 20 to about 80 weight percent of the copolymer of styrene and isobutylene and from about 20 to about 80 weight percent of the secondary polymer. In a preferred embodiment of the present invention the adhesive composition comprises from about 40 to about 65 weight percent of the copolymer of styrene and isobutylene and from about 35 to about 60 weight percent of the secondary polymer. The particular proportions within the above ranges can vary with the specific end use of the composition.

The basic hot-melt, pressure-sensitive adhesive composition of this invention can be modified with various materials to result in compositions which exhibit additional useful properties or decrease their cost. These materials which comprise plasticizers, mineral fillers, pigments, antioxidants, UV-absorbers and resin extenders are not critical to the present invention but are regularly used in the adhesive art to tailor the composition to a specific need.

The use of plasticizers in the compositions of the present invention can be desirable and will often enhance the machinability of the product by adjusting its viscosity at those temperatures at which the adhesive compositions are applied to a substrate. The incorporation of plasticizers into the adhesive composition can improve its aggressive tack or "quick-stick" property. Exemplary plasticizers which are used in the art and which can be suitably utilized in the compositions of the present invention are petrolatum, mineral oil, chlorinated parafins, diisobutyl phthalate, tricresyl phosphate, dioctyl phthalate, propylene glycol dibenzoate, chlorinated aromatic compounds, lower aliphatic esters of adipic acid, lower aliphatic esters of sebacic acid, and the like. The amount of plasticizer which can be used in the adhesive compositions can range up to about 20 percent by weight of the total composition.

Mineral fillers are commonly used in adhesive compositions as extenders to improve the economics of the formulation and often impart creep resistance to it. When used, these fillers can comprise up to about 30 percent by weight of the total formulation. Fillers which can be used in the compositions of this invention are exemplified by calcium carbonate, barium sulfate, silica, talc, china clay and bentonite.

Antioxidants and UV-absorbers can be incorporated into the adhesive compositions of this invention to improve their aging characteristics. Useful antioxidants and UV-absorbers are butylated hydroxy toluene, butylated hydroxy anisole, diphenolic hindered antioxidants, and the like.

The adhesive compositions of this invention can also be modified or extended with polymeric materials, other than those required as essential ingredients, having a softening point (ring and ball method) of from about 100° F. to about 350° F. and having a melt index of from about 2 to about 300. These materials can be hydrocarbon resins such as are commonly prepared from a dripolene stream, atactic polypropylene and polyethylene or resins such as rosin derivatives, terpene resins including alpha- and beta-pinene resins, and the like. The use of such extending resins is common practice in the adhesive art, especially for the purpose of lowering formulation costs or modifying the formulation to fit specific needs. Extending resins can be used to replace up to about 50 percent by weight of the copolymer of ethylene and vinyl acetate, the copolymer of ethylene and alkyl acrylate, the polyvinyl-alkyl ether, the terpolymer of ethylene, vinyl acetate and acrylic acid, or the terpolymer of ethylene, vinyl acetate and methacrylic acid, or 40 percent by weight of the total adhesive composition.

The hot-melt, pressure-sensitive adhesive compositions of the present invention can be readily prepared by mixing the ingredients at temperatures from about 200° to 400° F. in conventional formulating equipment. A typical preparation comprises charging the copolymer of styrene and isobutylene into a suitable formulating vessel equipped with heating and stirring means. This resin is then heated to a temperature which allows blending with the secondary resin in the molten state. The plasticizer is then added, if used, to facilitate stirring. After the desired temperature is reached, which will usually range from about 250° to about 350° F., the secondary resin can be added at a sufficiently slow rate that will not impair stirring. Other additives, when used, can be added at this time and heating and stirring are continued until a homogeneous blend is obtained. This composition can then be used directly for coating onto a desired substrate as a pressure-sensitive adhesive or can be placed into storage containers and cooled for future use.

For application to a substrate the adhesive is heated to a temperature in the range of from 250° to 350° F. Generally the lowest temperature that produces the viscosity desired and suitable for the particular application of the adhesive is employed.

The hot-melt, pressure-sensitive adhesive compositions of the present invention and their preparation are more specifically illustrated by the following examples.

EXAMPLE 3

A copolymer of styrene and isobutylene (80 grams) prepared in accordance with the procedures detailed in Example 1 and having a styrene/isobutylene monomer weight ratio of 50/50 was placed into a stainless steel cup and was heated with stirring to a temperature of about 330° F. A copolymer of ethylene and vinyl acetate (20 grams) having a melt index of from 22 to 28 and a vinyl acetate content of from 24 to about 32 percent by weight was incrementally added over a period of about 10 minutes. Heating and stirring were continued until a homogeneous composition was obtained. The composition was then applied as a thin coating to a flexible polyester sheet (Mylar, 1.0 mil) and was allowed to cool. The resulting pressure-sensitive adhesive tape was then subjected to certain tests to demonstrate the utility of the hot-melt, pressure-sensitive composition of this invention. The results are summarized in Table III.

EXAMPLE 4

A copolymer of styrene and isobutylene (55 grams) prepared in accordance with the procedures detailed in Example 1 and having a styrene/isobutylene monomer weight ratio of 50/50 was placed into a stainless steel cup and was heated, with stirring, to a temperature of about 340° F. Petrolatum (10 grams) and a mixture of copolymers of ethylene and vinyl acetate, 15 grams and 20 grams of copolymers having a percent vinyl acetate content of 27 to 29 and 39 to 42 respectively and having a melt index of 335 to 365 and 45 to 70 respectively, were then incrementally added over a period of about 20 minutes. Heating and stirring were continued until a homogeneous mixture was obtained. The composition was then coated onto a flexible polyester sheet for testing given the results as shown in Table III.

EXAMPLE 5

The copolymer of styrene and isobutylene (40 grams) prepared in accordance with the procedures described in Example 1 and having a styrene/isobutylene ratio of 50/50 was placed in a stainless steel cup and was heated, with stirring, to a temperature of about 340° F. A copolymer of ethylene and isobutyl acrylate (50 grams) having an isobutyl acrylate monomer content of about 20 weight percent and a melt index of about 250 (commercially sold as Zetafax-1278 by the Dow Chemical Company) and mineral oil (10 grams) were then added over a period of several minutes. Heating and stirring were continued until a homogeneous mixture was obtained. This mixture was then coated onto a flexible polyester sheet for testing. The results are given in Table III.

A variety of additional hot-melt, pressure-sensitive adhesive compositions were prepared in the manner described in the foregoing examples. In the following examples are given the essential ingredients in parts by weight which were utilized to form useful compositions by the procedures heretofore described. For the sake of brevity the copolymers of styrene and isobutylene of this invention are designated as SIB.

EXAMPLE 6

| | |
|---|---|
| SIB copolymer (50/50 styrene/isobutylene ratio) | 20 |
| Ethylene vinyl acetate copolymer (Ultrathene 664-X)[1] | 80 |

[1] A product of U.S. Industrial Chemicals Company

EXAMPLE 7

| | |
|---|---|
| SIB copolymer (50/50 styrene/isobutylene ratio) | 20 |
| Ethylene vinyl acetate copolymer (Ultrathene 660X) | 80 |

EXAMPLE 8

| | |
|---|---|
| SIB copolymer (50/50 styrene/isobutylene ratio) | 30 |
| Polyvinyl methyl ether (Gantrez M-094)[2] | 70 |

[2] A product of General Aniline and Film Corporation

EXAMPLE 9

| | |
|---|---|
| SIB copolymer (50/50 styrene/isobutylene ratio) | 55 |
| Ethylene vinyl acetate copolymer (Elvax 210)[3] | 15 |
| Ethylene vinyl acetate copolymer (Elvax 40) | 20 |
| Propylene glycol dibenzoate | 10 |

[3] A product of E. I. Du Pont De Nemours and Company

EXAMPLE 10

| | |
|---|---|
| SIB copolymer (50/50 styrene/isobutylene ratio) | 70 |
| Polyvinyl methyl ether (Gantrez M-094) | 30 |

EXAMPLE 11

| | |
|---|---|
| SIB copolymer (40/60 styrene/isobutylene ratio) | 60 |
| Ethylene vinyl acetate copolymer (Elvax 220) | 35 |
| Propylene glycol dibenzoate | 5 |

EXAMPLE 12

| | |
|---|---|
| SIB copolymer (copolymer No. 11 from Table II) | 40 |
| Ethylene vinyl acetate copolymer (Elvax 40) | 30 |
| Ethylene isobutyl acrylate copolymer (Zetafax 1370) | 20 |
| Petrolatum | 10 |

EXAMPLE 13

| | |
|---|---|
| SIB copolymer (copolymer No. 14 from Table II) | 20 |
| Polyvinyl-isobutyl ether (Gantrez B-201) | 65 |
| Talc | 15 |

EXAMPLE 14

| | |
|---|---|
| SIB copolymer (copolymer No. 1 from Table II) | 50 |
| Polyvinyl-methyl ether (Lutonal M40)[4] | 30 |
| Alpha-pinene resin | 20 |

[4] A product of BASF Corporation

EXAMPLE 15

| | |
|---|---|
| SIB copolymer (copolymer No. 1 from Table II) | 60 |
| Polyvinyl-ethyl ether (Lutonal A25) | 20 |
| Ethylene vinyl acetate copolymer (Elvax 210) | 20 |

EXAMPLE 16

| | |
|---|---|
| SIB copolymer (copolymer No. 1 from Table II) | 55 |
| Ethylene isobutyl acrylate copolymer (Zetafax 1278) | 30 |
| Polyvinyl-isobutyl ether (Gantrez B-201) | 10 |
| Dioctyl phthalate | 5 |

EXAMPLE 17

| | |
|---|---|
| SIB copolymer (copolymer No. 1 from Table II) | 60 |
| Ethylene, vinyl acetate and acrylic acid terpolymer | 30 |
| Petrolatum | 10 |

EXAMPLE 18

| | |
|---|---|
| SIB copolymer (copolymer No. 1 from Table II) | 60 |
| Ethylene, vinyl acetate and methacrylic acid terpolymer | 30 |
| Petrolatum | 10 |

TABLE III

| Test Compound | Finger Tack | Peel Adhesion 180° g./in. | Shear Adhesion hours |
|---|---|---|---|
| Product of Example 3 | good | 260 | 168+ |
| Product of Example 4 | good | 800 | 60 |
| Product of Example 5 | fair | 350 | 6.5 |
| Product of Example 6 | fair | 250 | 103+ |
| Product of Example 7 | good | 2000+ | 2 |
| Product of Example 8 | good | 1120 | 1.5 |
| Product of Example 9 | good | 310 | 24 |
| Product of Example 10 | good | 135 | 3 |

Finger tack is a simple preliminary test to determine the aggressive tack of the adhesive compositions. This test is performed by lightly touching the adhesive mass and rating the tenacity of the produced bond on a basis of poor, fair and good.

The peel adhesion and shear adhesion tests employed were conducted according the standardized tests promulgated by the Pressure Sensitive Tape Council, Glenview, Illinois, U. S. A.

We claim:

1. A hot-melt, pressure-sensitive adhesive composition consisting substantially of
   a. from about 20 to about 80 percent by weight of a solid homogeneous and essentially random copolymer of styrene and isobutylene having a number average molecular weight of from about 1,000 to about 4,000, a heterogeneity index of from about 1.50 to about 2.25 and a styrene content of from about 40 to about 90 weight percent,
   b. from about 20 to about 80 percent by weight of at least one polymer selected from the group consisting of (1) a copolymer of ethylene and vinyl acetate having a softening point of from about 180° F. to about 390° F., a percent vinyl acetate content of from about 15 to about 55 weight percent, and a melt index of from about 0.5 to about 500, (2) a copolymer of ethylene and an alkyl acrylate having an alkyl acrylate content of from about 15 to about 40 weight percent and a melt index from about 2 to about 300, and (3) a terpolymer of ethylene, vinyl acetate and acrylic or methacrylic acid,
   c. from 0 to about 20 percent by weight of the total composition of plasticizer,
   d. from 0 to about 30 percent by weight of the total composition of mineral filler and
   e. from 0 to about 40 percent by weight of the total composition of extending resin having a softening point of from about 100° F. to about 350° F. and a melt index of from about 2 to about 300.

2. The composition of claim 1, wherein the copolymer ($a$) has a number average molecular weight of from about 1,200 to about 3,500 and a ring and ball softening point of from about 140° F. to about 205° F.

3. The composition of claim 1, wherein the polymer ($b$) is the copolymer of ethylene and vinyl acetate.

4. The composition of claim 1, wherein the polymer ($b$) is the copolymer of ethylene and an alkyl acrylate.

5. The composition of claim 1, wherein the polymer ($b$) is the terpolymer of ethylene, vinyl acetate and acrylic or methacrylic acid.

6. The composition of claim 4, wherein the polymer is a copolymer of ethylene and isobutyl acrylate.

7. The composition of claim 1 wherein the copolymer of styrene and isobutylene is prepared by gradually contacting styrene and isobutylene in a proportion of from about 40 to 90 weight percent styrene at a polymerization temperature of from about 10° C. to about 50° C. in the presence of a hydrocarbon solvent with a catalyst system of an alkyl aluminum dihalide primary catalyst and at least one cocatalyst selected from the group consisting of water, an alcohol, an alkyl halide and a hydrogen halide, maintaining the styrene and isobutylene in reactive contact with the catalyst system for a time sufficient to insure complete polymerization.

* * * * *